United States Patent
Smith et al.

(10) Patent No.: US 6,806,823 B1
(45) Date of Patent: Oct. 19, 2004

(54) PASSIVE RADAR DETECTOR FOR DUALIZING MISSILE SEEKER CAPABILITY

(75) Inventors: Brian J. Smith, Huntsville, AL (US); Janice C. Rock, Lacey's Spring, AL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/688,480

(22) Filed: Oct. 20, 2003

(51) Int. Cl.[7] ............................. F41G 7/00; F42B 15/01
(52) U.S. Cl. ........................... 342/62; 342/13; 342/20; 342/52; 342/61; 244/3.1; 244/3.15; 244/3.19
(58) Field of Search ................ 244/3.1–3.3; 342/13–20, 342/52–56, 59, 61–63, 89–103, 175, 192–197, 350, 351, 450–465

(56) References Cited

U.S. PATENT DOCUMENTS

| | | | | |
|---|---|---|---|---|
| 3,949,955 A | * | 4/1976 | Sykes et al. | 244/3.19 |
| 4,108,400 A | * | 8/1978 | Groutage et al. | 244/3.15 |
| 4,264,907 A | * | 4/1981 | Durand et al. | 244/3.15 |
| 4,324,491 A | * | 4/1982 | Hueber | 244/3.13 |
| 4,562,439 A | * | 12/1985 | Peralta et al. | 342/196 |
| 5,061,930 A | * | 10/1991 | Nathanson et al. | 342/13 |
| 5,182,564 A | * | 1/1993 | Burkett et al. | 342/53 |
| 5,458,041 A | * | 10/1995 | Sun et al. | 244/3.11 |
| 5,629,705 A | * | 5/1997 | Spettel et al. | 342/62 |
| 6,150,974 A | * | 11/2000 | Tasaka et al. | 342/53 |
| 6,262,800 B1 | * | 7/2001 | Minor | 244/3.13 |
| 6,424,286 B1 | | 7/2002 | Smith et al. | 342/14 |
| 6,606,066 B1 | * | 8/2003 | Fawcett et al. | 343/725 |
| 6,693,580 B1 | * | 2/2004 | Wehling | 342/20 |

* cited by examiner

*Primary Examiner*—Bernarr E. Gregory
(74) *Attorney, Agent, or Firm*—Hay Kyung Chang

(57) ABSTRACT

Applicants' Passive Radar Detector for Dualizing Missile Seeker Capability incorporates passive RF detectors into a standard active MMW seeker missile with a minimum requirement for hardware modifications. Anti-radiation homing (ARH) antennas and down conversion elements are added to the missile and coupled to existing signal-processing hardware. The added antennas intercept the air defense radar emission signals and the conversion elements convert the intercepted signals to the intermediate frequency (IF) usable by the MMW radar. The IF can then be processed by signal processor that already exists as a part of the MMW seeker.

5 Claims, 2 Drawing Sheets

PASSIVE RADAR DETECTOR FOR DUALIZING MISSILE SEEKER CAPABILITY

DEDICATORY CLAUSE

The invention described herein may be manufactured, used and licensed by or for the Government for governmental purposes without the payment to us of any royalties thereon.

BACKGROUND OF THE INVENTION

Having begun using anti-radiation homing missiles (ARM) 30 years ago during the Vietnam War to suppress hostile air defense radars, the U.S. military has used ARM's in every conflict since then. In an ARM, a microwave receiver on the missile is tuned to the frequency of the threat radar to enable it to acquire the radar. Upon acquisition, the received frequency is processed to derive direction finding (DF) information which is subsequently provided to the missile's autopilot. The result is a more direct hit of the missile on the target radar.

While its operation sounds fairly straightforward, ARM's suffer from two major problems. One is that if no target radar turns on during the discover-and-destroy mission, the ARM is totally useless. Another is that ARM's typically are not able to hit the target radars when some of the radar's energy bounces off the ground around the radar and gives a false target. Further, air defense radars usually blink (i.e. turn on and off) as a countermeasure, resulting in a low kill probability for the threat radar.

Thus it is desirable to have a dual or multi-mode seeker weapon that has both an active mode, such as millimeter wave (MMW) or Imaging Infrared (IIR), and a passive mode radio-frequency (RF) homing capability. Such a multi-mode seeker has two main advantages. The first is that if no emitting air defense radar is encountered, the weapon can still be used in the active mode since the active mode requires no emission from the target. The MMW radar on the missile emits signals that are reflected from the target and received back at the missile by MMW antenna 201. The second is that the active mode can also be used for the terminal portion of the missile's flight, after the missile has flown the initial and mid-course portions using the passive mode, to decrease any miss distance from the target radar.

The drawbacks to dual/multi-mode weapons are their cost and the present inability to put physically all of the required hardware into the missile due to limited space.

SUMMARY OF THE INVENTION

Applicants' Passive Radar Detector for Dualizing Missile Seeker Capability overcomes the drawbacks mentioned above by incorporating a passive RF detector into a standard active MMW seeker missile with a minimum of microwave hardware modifications. To accomplish this, anti-radiation homing (ARH) antennas and down conversion elements are added to the missile. The added antennas intercept the air defense radar emission signals and the conversion elements convert the intercepted signals to the intermediate frequency (IF) usable by the MMW radar. The IF can then be processed by the signal processor that already exists as a part of the MMW seeker. Using the existing processor greatly reduces both the size and cost of having a passive supplemental detector for detecting hostile radars.

DESCRIPTION OF THE PREFERRED EMBODIMENT

Figure 1:
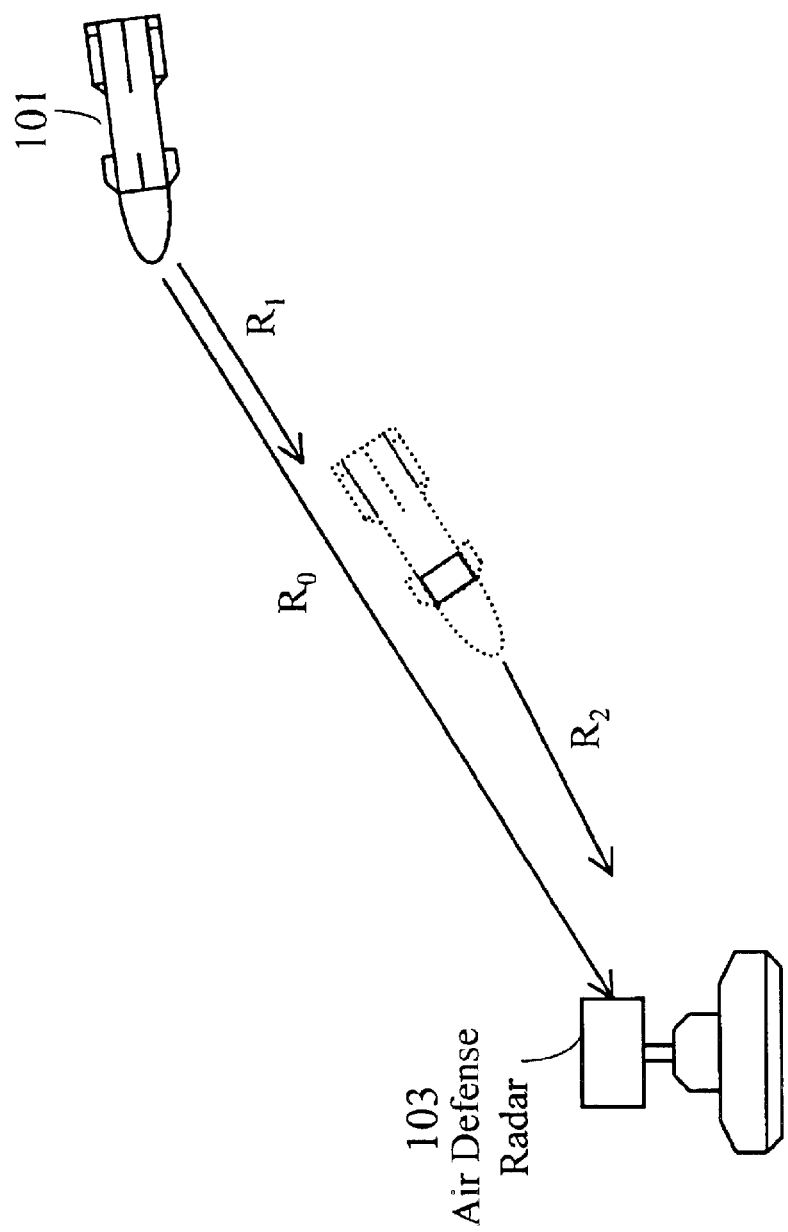
FIG. 1 illustrates the overall operational scheme for a missile having dual mode radar seeking capability.

Referring now to the drawing wherein like numbers represent like parts in each of the figures, the Passive Radar Detector for Dualizing Missile Seeker Capability is explained in detail.

FIG. 1 illustrates the overall operational scheme for a missile having both active MMW and passive ARH radar seeking capabilities. During the initial and mid-course portion, designated $R_1$, of the entire path $R_0$ between deployment of missile 101 and selected hostile air-defense radar 103, the missile homes on the emissions from the hostile radar. But during the terminal portion, $R_2$, the missile switches to the active MMW mode to acquire the hostile radar and provide accurate guidance to it. The distance $R_2$ is a function of the missile's speed and maneuverability, but is generally in the range of 2–4 Km for a tactical missile. If there is no emission from any hostile radar, then the missile can be used in the purely active MMW mode against selected targets.

Figure 2:
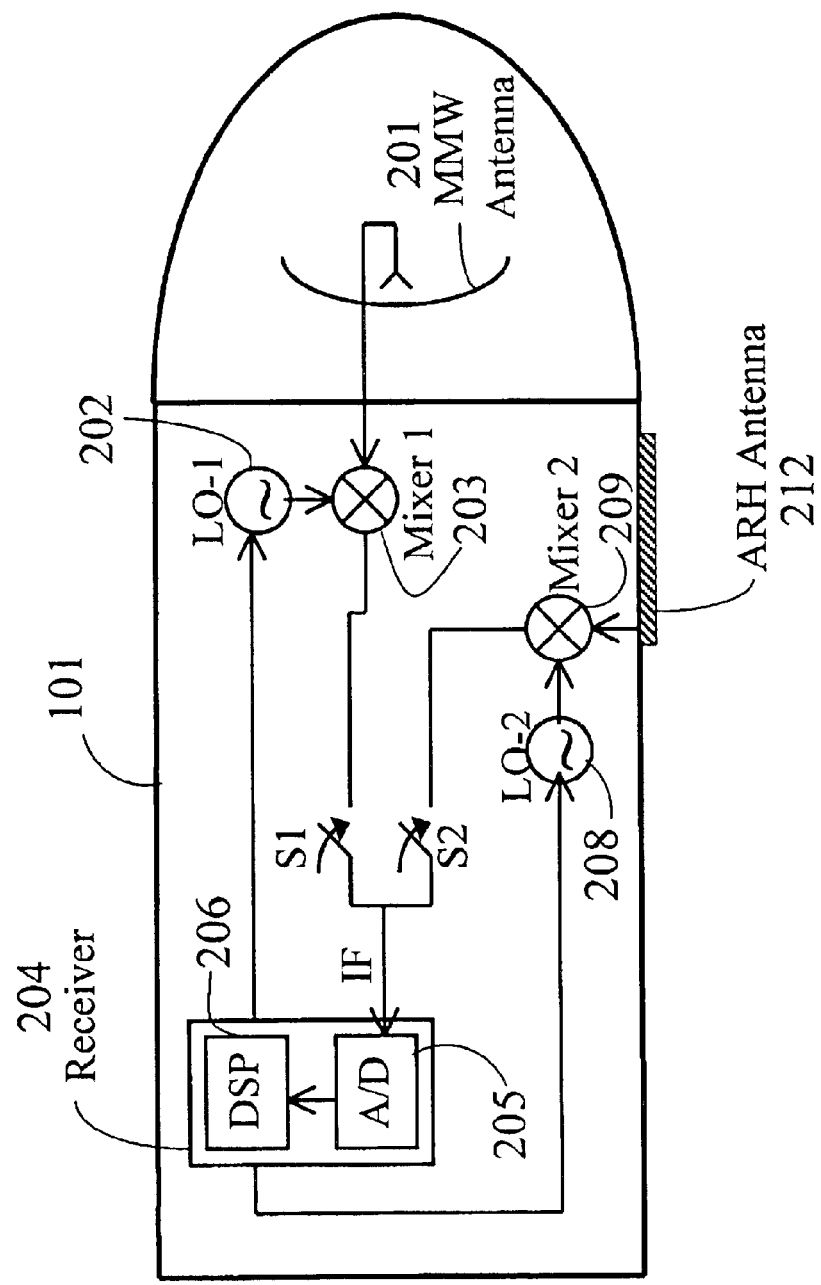
FIG. 2 is a schematic diagram of the dual mode capability.

FIG. 2 shows schematically how a passive mode radio frequency ARH detector is incorporated into a missile that already has MMW capability. Even though the figure shows only one channel of the passive ARH detector, this is for illustrative purposes only. For best performance, at least three, preferably four, passive detector channels should be incorporated, with corresponding ARH antennas 212 being mounted on the exterior of the missile at regular intervals around the missile's circumference. With the proper multiplexing between them, the multiple detector channels provide the azimuth and elevation direction finding (DF) information.

Two basic DF techques can be used: phase comparison monopulse and amplitude comparison monopulse. Because of the broad beamwidths of the end-fired antennas envisioned for this invention, the phase comparison monopulse technique is preferred. In the well-known phase comparison DF technique, the angle of arrival of the radar emission signal is determined by comparing the phase of the emission signals from a set of antennas.

In the purely MMW mode, first switch S1 is closed and second switch S2 is open. In this mode, the MMW signal received by MMW antenna 201 is down-converted to intermediate frequency (IF). The conversion is performed by first mixer 203 which simply multiplies frequencies of first local oscillator 202 and those of the incoming reflected MMW signals. The IF signal is then transmitted via switch S1 to receiver 204 which digitizes the IF signal using analog-to-digital converter (A/D) 205. The digitized signal is processed by digital signal processor 206 to provide estimates of where the target is with respect to the missile.

When the missile is in the ARH mode, switch S1 is open and S2 is closed. The signal emitted by the threat radar is collected by ARH antenna 212 and is converted to IF by second mixer 209 which multiplies the collected radar signal with the signal input from second local oscillator 208. The IF is input via S2 to analog-to-digital converter 205 where it is processed in the same way the IF in MMW mode is processed. In the ARH mode, digital signal processor 206 utilizes a set of logic that is specifically designed for identifying and processing threat radar signals. Algorithms for sorting and processing hostile radar signals are well known in the art.

In both modes, the digital signal processor (DSP) controls the frequency of the local oscillators. For the first local oscillator, if a step-frequency pulse generation is used, the DSP controls the frequencies generated in the first oscillator so that the signal returning from threat radar is down-converted to a frequency that can be digitized in the A/D. This allows for frequency agility so that different waveforms can be utilized as needed in the detection system. For the second local oscillator, DSP control allows the signal received by the ARH antenna to be down-converted to a signal of lower frequency that can be digitized by the A/D. The frequency of the second local oscillator is changeable depending on the radar frequency to be detected.

Upon reaching the beginning of range $R_2$, S2 is opened and S1 closed so that the terminal portion of the missile's flight can be conducted using direction finding information from the MMW antenna.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. In a missile having an active radar seeker, said seeker operating at a given intermediate frequency and comprising a millimeter wave radar and antenna, first local oscillator, a first mixer, an analog-to-digital converter, a first switch coupled between said first mixer and said converter, and a digital signal processor, said processor containing therein and using a set of logic capable of identifying threat radar signals, what is claimed is a means for dualizing said missile's seeker capability, said dualizing means being located within said missile and passively detecting target air defense radars, said dualizing means further cooperating with said active millimeter wave radar seeker to guide said missile toward a more accurate impact on said air defense radars, said dualizing means comprising a plurality of identical radio frequency detectors, each of said frequency detectors comprising: an anti-radiation homing antenna positioned to collect radar frequency from said air defense radar; a second local oscillator, the frequency of said second oscillator being selectively adjustable; a second mixer coupled between said anti-radiation homing antenna and said second oscillator to mix said radar frequency and said adjustable frequency to produce an intermediate frequency usable by said active seeker; and a means for coupling said intermediate frequency to said analog-to-digital converter, ultimately to enable said missile to impact on said air defense radar for a more complete destruction of said defense radar.

2. In a missile having an active radar seeker, a means for dualizing seeker capability as set forth in claim 1, wherein said means for coupling said intermediate frequency to said analog-to-digital converter is a second switch coupled between said second mixer and said converter, said second and first switches never being concurrently open.

3. A seeker capability dualizing means as set forth in claim 2, wherein said plurality of identical radio frequency detectors comprises at least three sensors having three corresponding anti-radiation homing antennas, wherein said antennas are disposed at regular intervals along the circumference of said missile so as to enable the production of data relative to azimuth and elevation of said missile with respect to said target air defense radar.

4. A seeker capability dualizing means as set forth in claim 3, wherein said multiple detectors are multiplexed to said converter such that their respective second switches are selectively activated in coordination with each other as well as with said first switch.

5. In a missile having an active millimeter wave radar seeker, said seeker operating at a given intermediate frequency and comprising a millimeter wave radar and antenna, first local oscillator, a first mixer, an analog-to-digital converter, a first switch coupled between said first mixer and said converter, and a digital signal processor, said processor containing therein and using a set of logic capable of identifying threat radar signals, what is claimed is a passive detector added to supplement said active seeker, said passive detector detecting target air defense radars and cooperating with said active seeker to guide said missile toward a more accurate impact on said air defense radars, said passive radar detector comprising four identical radio frequency sensors, said frequency sensors being disposed at regular space intervals along the circumference of said missile and each sensor comprising: an anti-radiation homing antenna positioned to collect radar frequency from said air defense radar; a second local oscillator, the frequency of said second oscillator being selectively adjustable; a second mixer coupled between said anti-radiation homing antenna and said second oscillator to mix said radar frequency and said adjustable frequency to produce an intermediate frequency usable by said active seeker; and a means for coupling said intermediate frequency to said analog-to-digital converter, ultimately to enable said missile to impact on said air defence radar for a more complete destruction of said radar.

* * * * *